(12) United States Patent
Nalam Venkat et al.

(10) Patent No.: US 12,504,366 B2
(45) Date of Patent: Dec. 23, 2025

(54) DIAGNOSTIC INSTRUMENTS HAVING MULTIPLE ILLUMINATION SOURCES AND METHODS THEREOF

(71) Applicant: Siemens Healthcare Diagnostics Inc., Tarrytown, NY (US)

(72) Inventors: Rayal Raj Prasad Nalam Venkat, Princeton, NJ (US); Yao-Jen Chang, Princeton, NJ (US); Benjamin S. Pollack, Jersey City, NJ (US); Ankur Kapoor, Plainsboro, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 187 days.

(21) Appl. No.: 18/554,988

(22) PCT Filed: Mar. 25, 2022

(86) PCT No.: PCT/US2022/071367
§ 371 (c)(1),
(2) Date: Oct. 11, 2023

(87) PCT Pub. No.: WO2022/221811
PCT Pub. Date: Oct. 20, 2022

(65) Prior Publication Data
US 2024/0201083 A1 Jun. 20, 2024

Related U.S. Application Data

(60) Provisional application No. 63/175,005, filed on Apr. 14, 2021.

(51) Int. Cl.
*G01N 21/3577* (2014.01)
*G01N 21/33* (2006.01)
(Continued)

(52) U.S. Cl.
CPC ......... *G01N 21/3577* (2013.01); *G01N 21/33* (2013.01); *G01N 21/359* (2013.01); *G01N 33/487* (2013.01)

(58) Field of Classification Search
CPC .. G01N 21/3577; G01N 21/33; G01N 21/359; G01N 33/487; G01N 21/253;
(Continued)

(56) References Cited

U.S. PATENT DOCUMENTS 6,587,575 B1 7/2003 Windham et al.
7,840,360 B1 11/2010 Micheels et al.
(Continued)

FOREIGN PATENT DOCUMENTS

JP 2009008460 A 1/2009
JP 2018514349 A 6/2018
(Continued)

OTHER PUBLICATIONS

PCT International Search Report and Written Opinion dated Jun. 8, 2022 (9 Pages).
(Continued)

*Primary Examiner* — Kiho Kim

(57) ABSTRACT

A method of operating a diagnostic instrument includes illuminating an imaging location of the diagnostic instrument with first light having a first spectrum for a first period and capturing a first image of the imaging location illuminated by the first light. The method further includes illuminating the imaging location of the diagnostic instrument with second light having a second spectrum for a second period, the second spectrum being more destructive to a chemical configured to be received in the diagnostic instrument than the first spectrum; and capturing a second image of the imaging location illuminated by the second light. Other methods and diagnostic instruments are disclosed.

20 Claims, 7 Drawing Sheets

(51) Int. Cl.
*G01N 21/359* (2014.01)
*G01N 33/487* (2006.01)

(58) Field of Classification Search
CPC .............. G01N 21/255; G01N 33/49; G01N 2021/3155; G01N 2035/0437; G01N 2035/0443; G01N 21/31; G01N 2201/023; G01N 21/01; G01J 3/2823; G01J 2003/106; G01J 3/10
See application file for complete search history.

(56) References Cited

U.S. PATENT DOCUMENTS

| | | | |
|---|---|---|---|
| 9,091,676 B2 | 7/2015 | Rule et al. | |
| 10,140,705 B2 | 11/2018 | Wu et al. | |
| 2014/0293277 A1 | 10/2014 | Subbiah et al. | |
| 2018/0045654 A1 | 2/2018 | Park et al. | |
| 2020/0191714 A1 | 6/2020 | Wissmann et al. | |
| 2022/0196474 A1* | 6/2022 | Bogacz | A61B 5/0035 |

FOREIGN PATENT DOCUMENTS

| | | | |
|---|---|---|---|
| JP | 2019510963 A | 4/2019 | |
| JP | 2020513966 A | 5/2020 | |
| JP | 2021045524 A | 3/2021 | |
| WO | 2017057077 A1 | 4/2017 | |
| WO | 2018/089935 A1 | 5/2018 | |
| WO | 2020/061365 A1 | 3/2020 | |
| WO | 2022/174241 A1 | 8/2022 | |

OTHER PUBLICATIONS

Jantschitsch, C et al. "Infrared Radiation Confers Resistance to UV-Induced Apoptosis Via Reduction of DNA Damage and Upregulation of Antiapoptolic Proteins" 1271-1279. Journal of Investigative Dermatology. Online. Nov. 27, 2008; abstract; DOI: 10.1038/jid. 2008.362.
https://en.wikipedia.org/wiki/Beer-Lambert_law.
Virkler, K et al. "Analysis of body fluids for forensic purposes: From laboratory testing to non-destructive rapid confirmatory identification at a crime scene" Forensic Science International 188 (2009) 1-17. https://www.sjsu.edu/people/steven.lee/courses/c3/s2/New%20Non%20destructive%20confirmatory%20tests-1.pdf.
Rehak, N et al. "Photolysis of bilirubin in serum specimens exposed to room lighting" Clin Chim Acta. Jan. 2008 ; 387(1-2): 181-183. doi:10.1016/j.cca.2007.09.019.
Meyerstein, W et al. "Effect of Light On Red Blood Cells. the Light Sensitivity of Blood From Different Vertebrate Species" J. Physiol., Jun. 30, 1941; 99, 510-514.
https://www.mayocliniclabs.com/specimen/preparation/light-protection.html.
Lin, A et al. "Forensic applications of infrared imaging for thedetection and recording of latent evidence" J Forensic Sci., Sep. 2007;52(5):1148-1150.
https://pharmaxchange.info/2012/05/ultraviolet-visible-uv-vis-spectroscopy--limitations-and-deviations-of-beer-lambert-law/.
https://en.wikipedia.org/wiki/Full-spectrum_photography.
Kearse, K "Ultraviolet 365 as an Alternative Light Source for Detection of Blood Serum" J Forensic Sci, Sep. 2020, vol. 65, No. 5: 1716-1721.
"Beer-Lambert law." Wikipedia, Wikimedia Foundation, last modified on Nov. 16, 2021, accessed [Dec. 8, 2021] <https://en.wikipedia.org/wiki/Beer-Lambert_law>.
"Light Protecction Tests." Mayo Clinic Laboratories, accessed [Dec. 8, 2021] <https://www.mayocliniclabs.com/specimen/preparation/light-protection.html>.
"Full-spectrum photography." Wikipedia, Wikimedia Foundation, last modified on Nov. 12, 2018, accessed [Dec. 8, 2021] <https://en.wikipedia.org/wiki/Full-spectrum_photography>.

* cited by examiner

DIAGNOSTIC INSTRUMENTS HAVING MULTIPLE ILLUMINATION SOURCES AND METHODS THEREOF

CROSS REFERENCE TO RELATED APPLICATIONS

This disclosure is a 371 of PCT/US2022/071367, filed Mar. 25, 2022, which claims the benefit of U.S. Provisional Patent Application No. 63/175,005, entitled "DIAGNOSTIC INSTRUMENTS HAVING MULTIPLE ILLUMINATION SOURCES AND METHODS THEREOF," filed Apr. 14, 2021, the disclosures of which are hereby incorporated by reference in their entireties for all purposes.

FIELD

Embodiments of this disclosure relate to diagnostic instruments including multiple illumination sources and methods of operating diagnostic instruments.

BACKGROUND

Some clinical diagnostic instruments process photosensitive materials, such as blood, plasma, and serum, that may degrade by excess exposure to certain wavelengths (e.g., spectrums) of light. Some spectrums, such as spectrums including ultraviolet light (UV light) may be especially harmful to some photosensitive materials. For example, exposure to UV light having a wavelength of 255 nm for just 30 seconds can damage DNA in blood enough to be undetectable during a polymerase chain reaction (a common procedure to quantify DNA). Another example of a photosensitive material that degrades during exposure to certain wavelengths of light includes bilirubin in serum. In another example, certain wavelengths of light may accelerate the onset of hemolysis in vertebrate blood.

During operation of diagnostic instruments, some components and materials may need to be imaged using different spectrums of light. Light used during the imaging may damage photosensitive materials located in the diagnostic instruments. Diagnostic instruments and methods are sought that reduce exposure of photosensitive materials to spectrums of light that may damage the photosensitive materials.

SUMMARY

According to a first aspect, a method of operating a diagnostic instrument is disclosed. The method includes illuminating an imaging location of the diagnostic instrument with first light having a first spectrum for a first period; capturing a first image of the imaging location illuminated by the first light; illuminating the imaging location of the diagnostic instrument with second light having a second spectrum for a second period, the second spectrum being more destructive to a chemical configured to be received in the diagnostic instrument than the first spectrum; and capturing a second image of the imaging location illuminated by the second light.

In another aspect, a method of operating a diagnostic instrument is disclosed. The method includes illuminating an imaging location of the diagnostic instrument with first light having a first spectrum for a first period; capturing a first image of the imaging location illuminated by the first light; analyzing the first image; determining, based on the analyzing, a second light to illuminate the imaging location, the second light having a second spectrum, the second spectrum being more destructive to a specimen receivable in the diagnostic instrument than the first spectrum; determining, based on the analyzing, a second period that the second light is to illuminate the imaging location, the second period being less than the first period; illuminating the imaging location with the second light for the second period; and capturing a second image of the imaging location illuminated by the second light.

In another aspect, a diagnostic instrument is provided. The diagnostic instrument includes an imaging location; a first illumination source configured to illuminate the imaging location with first light having a first spectrum for a first period; a second illumination source configured to illuminate the imaging location with second light having a second spectrum for a second period, wherein the second spectrum is more destructive to a specimen receivable in the diagnostic instrument than the first spectrum and the second period is less than the first period; an imaging device configured to capture a first image of the imaging location illuminated by the first light and a second image of the imaging location illuminated by the second light; and a computer configured to execute instructions to: analyze the first image; determine the second spectrum in response to analyzing the first image; and determine the second period in response to analyzing the first image.

Still other aspects, features, and advantages of this disclosure may be readily apparent from the following description and illustration of a number of example embodiments, including the best mode contemplated for carrying out the disclosure. This disclosure may also be capable of other and different embodiments, and its several details may be modified in various respects, all without departing from the scope of the disclosure. This disclosure is intended to cover all modifications, equivalents, and alternatives falling within the scope of the claims.

BRIEF DESCRIPTION OF THE DRAWINGS

The drawings, described below, are for illustrative purposes, and are not necessarily drawn to scale. Accordingly, the drawings and descriptions are to be regarded as illustrative in nature, and not as restrictive. The drawings are not intended to limit the scope of the disclosure in any way.

DETAILED DESCRIPTION

Figure 1:
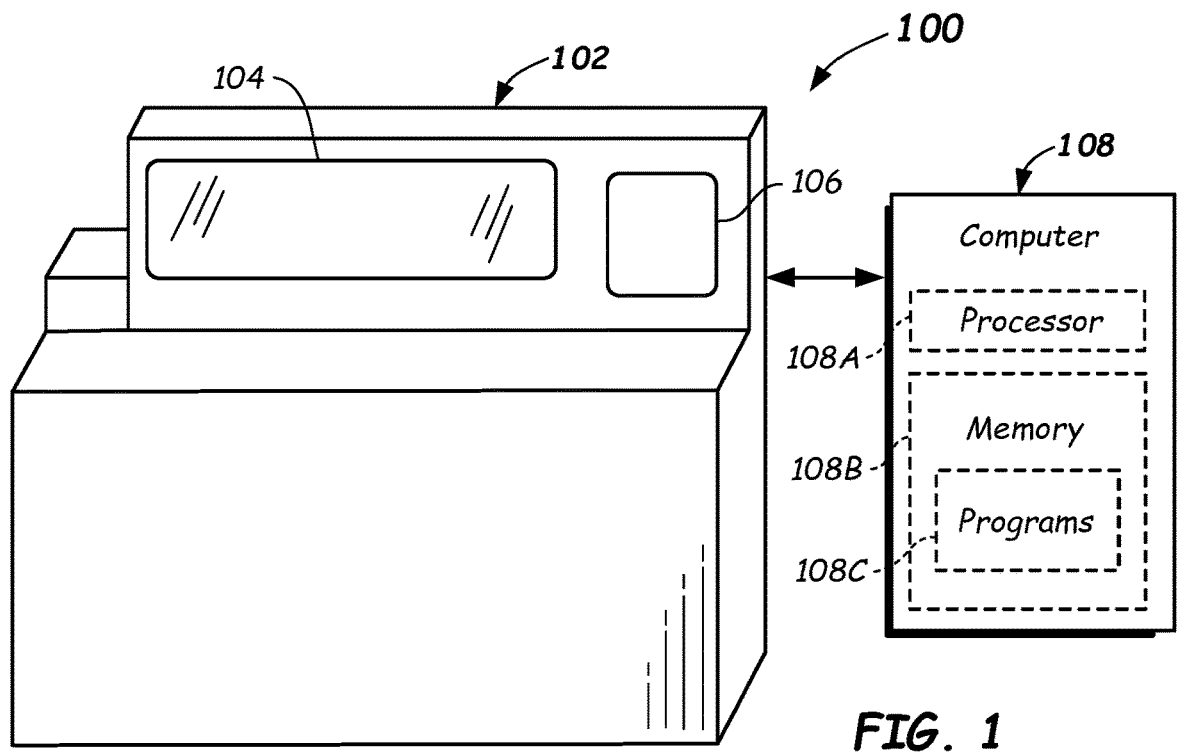
FIG. 1 illustrates a front isometric view of a diagnostic instrument coupled to a computer wherein the diagnostic instrument includes multiple illumination sources according to one or more embodiments.

Diagnostic instruments perform analyses on specimens obtained from people, such as patients. Examples of specimens include, but are not limited to, blood, serum, plasma, sweat, nasal swabs, urine, cerebrospinal fluid, or any other human body liquid. The analyses may include photometric analysis wherein the specimens are illuminated by preselected light intensities and spectrums (e.g., wavelengths) for preselected periods. Imaging devices in the instruments capture images of the illuminated specimens to determine the presence and/or concentrations of one or more chemicals (e.g., analytes) within the specimens.

In addition to the above-described analyses, the diagnostic instruments may also process specimens and/or specimen containers containing the specimens. The diagnostic instruments may include components configured to aspirate specimens and reagents and to dispense specimens and reagents into cuvettes or other containers used during analyses. In some examples, the diagnostic instruments may include components that mix liquids, such as the specimens and the reagents. The diagnostic instruments may also include components that are configured to calibrate and/or monitor other components.

Some specimens are damaged or destroyed when exposed to certain spectrums of light. For example, ultraviolet (UV) light may damage some specimens. In particular, UV light having a wavelength of 365 nm is especially destructive to some specimens including blood, plasma, and serum. In addition, visible light may be destructive to some specimens. Infrared light (IR light) and near infrared light (NIR light) are not destructive to some specimens or are not as destructive to some specimens as UV light and visible light. For example, IR light and NIR light are less destructive to blood, plasma, and serum than UV light and visible light. However, UV light and visible light have benefits in the instruments. For example, visible light may be useful for optically calibrating and diagnosing components within the diagnostic instruments. UV light is useful for identifying spills, such as specimen and reagent spills, in the diagnostic instruments.

The diagnostic instruments described herein include illumination sources (e.g., light sources) that emit light having different spectra to prevent or reduce damage to the specimens and/or the reagents located within the diagnostic instruments. In some embodiments, first light emitted by an illumination source and having a first spectrum is less destructive to the specimens and/or the reagents than second light having a second spectrum. In some embodiments, the first light is IR light or NIR light and the second light is UV light or visible light. The first light may be emitted by a first illumination source and the second light may be emitted by a second illumination source.

In use, the first light may illuminate components located at at least one imaging location in a diagnostic instrument. Images located at an imaging location illuminated by the first light for a first period are captured and analyzed. Based on the analyses, a determination is made as to whether images of the imaging location illuminated with the second light need to be captured. In addition, the analyses may determine a second period that the imaging location is illuminated by the second light to cause no or minimal damage to the specimens or other photosensitive materials.

The above described diagnostic instruments and methods along with other embodiments of diagnostic instruments and methods are described in greater detail with reference to FIGS. 1-9 herein.

Reference is now made to FIG. 1, which illustrates a front isometric view of a diagnostic instrument 100. The diagnostic instrument 100 may be a standalone instrument or the diagnostic instrument 100 may be a component of a larger laboratory analysis system that may include a plurality of interconnected modules and instruments. The diagnostic instrument 100 is configured to receive specimens (e.g., from people or patients) and perform analyses on the specimens to determine the presence and/or concentration of one or more chemicals (e.g., analytes and/or proteins) in the specimens. The specimens may include blood, serum, plasma, sweat, nasal swab, urine, cerebrospinal fluid, or any other human body liquid or liquid extracted from bodily tissue.

The diagnostic instrument 100 may include a chamber 102 where specimens are processed and/or analyzed (e.g., tested). Accordingly, the chamber 102 may include components (not shown in FIG. 1) configured to perform processing and analyses of the specimen as described herein. In some embodiments, photometric analysis is performed in the chamber 102. In some embodiments, chemicals (e.g., reagents) are mixed with specimens in the chamber 102 to perform analyses or prepare the specimens for analyses. In order to perform accurate analyses, the chamber 102 may be devoid of extraneous light having wavelengths that are destructive to chemicals or specimens located in the chamber 102. For example, ambient light may be prevented from entering the chamber 102.

As described above, some of the specimens may be destroyed or damaged when exposed to one or more certain light spectrum. For example, with sufficient exposure, UV light (100 nm to 400 nm) may destroy blood, plasma, and serum and near infrared (NIR) light (750 nm to 2, 500 nm) and infrared (IR) light (700 nm to 1 mm) have little impact on blood, plasma, and serum. In other examples, bilirubin in serum degrades and the onset of hemolysis in vertebrate blood accelerates in ambient room lighting (e.g., visible light of 750 nm to 2,500 nm). In the embodiment of FIG. 1, the chamber 102 may include a shutter 104, such as an opaque shutter that blocks (e.g., filters or attenuates) some wavelengths of light from entering the chamber 102. In some embodiments, the shutter 104 may be tinted with a colored material such as an amber-colored material. In some embodiments, the shutter 104 may block light having wavelengths between about 10 nm and about 400 nm. Thus, analyses performed in the chamber 102 behind the shutter 104 are not exposed to damaging visible light. Visible light is 380 nm to 700 nm.

In some embodiments, the diagnostic instrument 100 may include a display 106. In some embodiments, the display 106 may be a touchscreen that enables a user of the diagnostic instrument 100 to input data via the display 106. For example, the display 106 may display one or more menus and the like wherein the user touches items on the menus to control the diagnostic instrument 100, input data to the diagnostic instrument 100, and/or retrieve data from the diagnostic instrument 100. In some embodiments, the diagnostic instrument 100 may include one or more cameras (not shown in FIG. 1) located in the chamber 102 and configured to capture images (e.g., digital pixelated images) of one or more imaging locations in the chamber 102. The display 106 may be configured to display the captured images.

The diagnostic instrument 100 may include or be in communication with a computer 108. The computer 108 may include a processor 108A, memory 108B, and programs 108C stored in the memory 108B. The processor 108A may be configured to execute the programs 108C stored in the memory 108B. Programs 108C may include instructions that enable the computer 108 or the diagnostic instrument 100 to perform actions such as illuminating with multiple light sources, make determinations, and perform analyses as described herein. The computer 108 and the programs 108C stored therein may perform other processes such as operating the diagnostic instrument 100.

Figure 2:
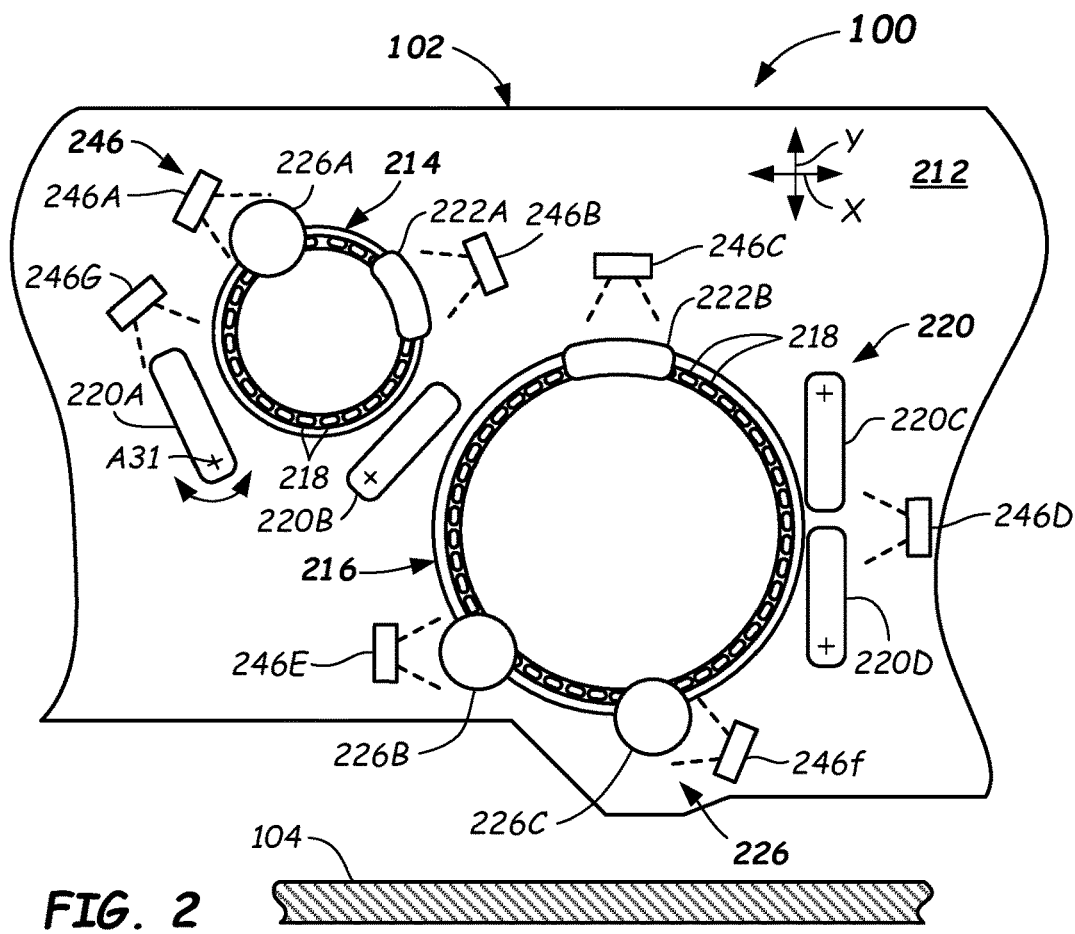
FIG. 2 illustrates a top plan view of a portion of an interior of a chamber of a diagnostic instrument according to one or more embodiments.

Additional reference is made to FIG. 2, which illustrates a top plan view of an embodiment of an interior of the chamber 102. The chamber 102 may include a platform or chassis 212 (hereinafter "platform") on which one or more components within the chamber 102 are attached. For example, one or more components that test specimens and/or prepare specimens for testing may be attached to, or set upon, the platform 212. As described above, these components may operate in the dark or in light (e.g., IR or NIR) or in some light sub-spectrum thereof that does not damage the specimens and/or reagents.

The chamber 102 depicted in FIG. 2 includes a dilution ring 214 and a reaction ring 216 (sometimes referred to as an "incubation ring"). In the embodiment of FIG. 2, both the dilution ring 214 and the reaction ring 216 include a plurality of cuvettes 218 (a few labelled) residing therein. Both the dilution ring 214 and the reaction ring 216 may be configured to move (e.g., rotate) relative to the platform 212 so as to move the cuvettes 218 relative to the platform 212. As described herein, each of the cuvettes 218 are configured to hold a specimen and/or a reagent used to perform analyses on the specimens. In the embodiment of FIG. 2, a portion of one or more of the cuvettes 218 may extend below the platform 212.

One or more photometric devices (e.g., optical inspection system 538, FIG. 5) that may include illumination sources (such as one or more laser light-sources) and imaging devices, may be located below the platform 212 and may capture images or acquire laser readings concerning the contents of the cuvettes 218. The images and/or signal readings may be used to analyze the specimens for the presence and/or concentrations of one or more chemicals (e.g., analytes or proteins). In some embodiments, the analyses may be performed by comparing the present image or signal reading to a reference image or signal reading that may have been previously acquired.

The diagnostic instrument 100 receives specimens and transports the specimens to the chamber 102. In some embodiments, the chamber 102 may include one or more probe assemblies 220 that are configured to aspirate and dispense liquids into and out of the cuvettes 218 and other liquid storage vessels, such as reagent containers (not shown). The embodiment of FIG. 2 includes four probe assemblies 220, which are referred to individually as the first probe assembly 220A, the second probe assembly 220B, the third probe assembly 220C, and the fourth probe assembly 220D. All of the probe assemblies 220 may be identical or substantially similar. Other embodiments may include fewer or more probe assemblies 220.

Figure 3:
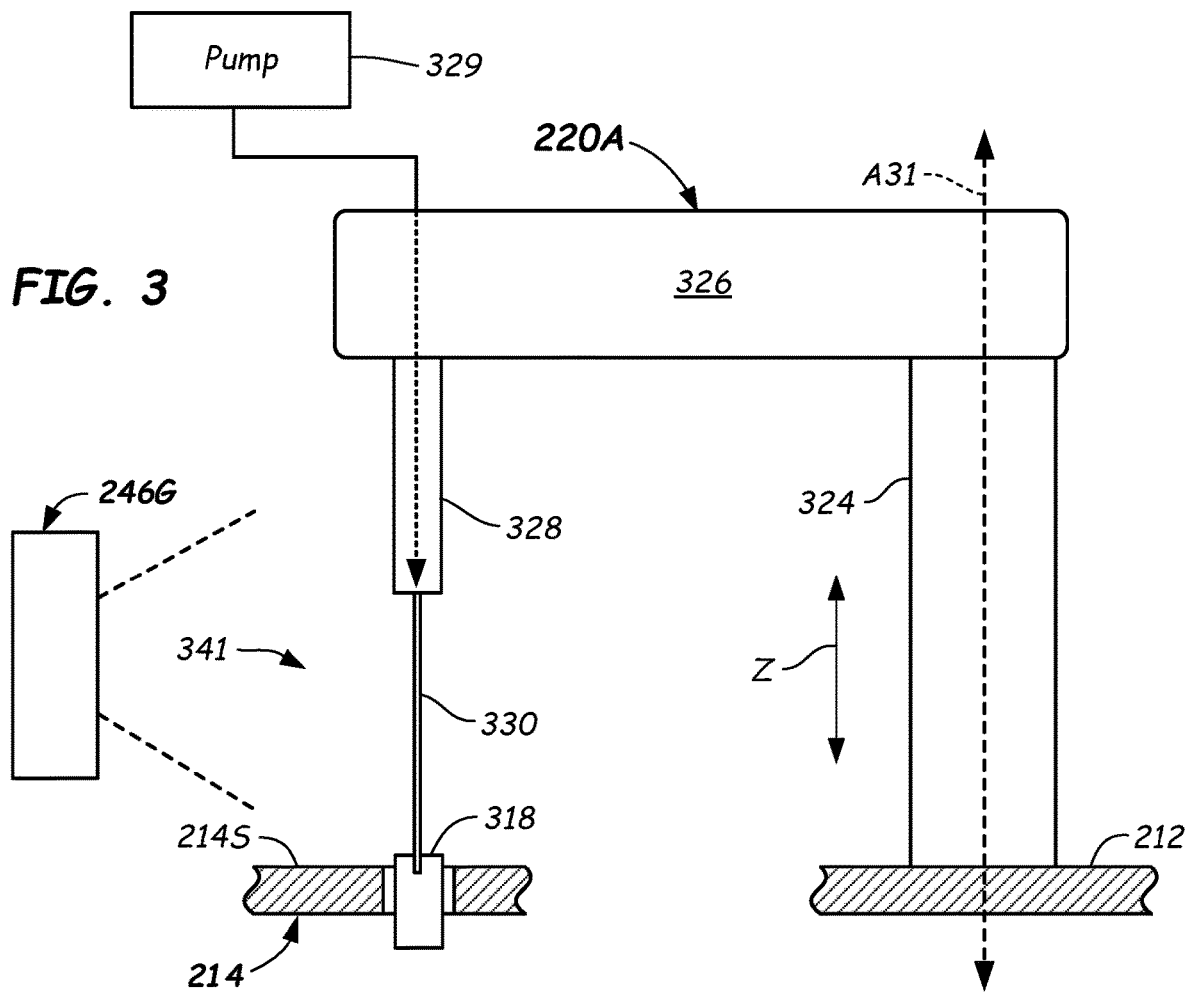
FIG. 3 illustrates a side elevation view of a probe assembly and a partial cross-sectioned view of a platform and a dilution ring in a chamber of a diagnostic instrument according to one or more embodiments.

Additional reference is made to FIG. 3, which illustrates a side elevation view of the first probe assembly 220A and a partial cross-sectioned view of the platform 212 and the dilution ring 214. The first probe assembly 220A may be similar or identical to all the probe assemblies 220. The probe assemblies 220 may be configured to move relative to the platform 212. In the embodiment depicted in FIG. 2, the probe assemblies 220 are configured to rotate about axes extending normal to the platform 212. For example, and as shown in FIG. 3, the first probe assembly 220A may rotate about an axis A31. The first probe assembly 220A or one or more portions of the first probe assembly 220A may be configured to move in a Z-direction, which is toward and away from the platform 212 and the dilution ring 214. In some embodiments, the first probe assembly 220A may be a robot or may operate as a robot.

The first probe assembly 220A may include a post 324 and an arm 326. The post 324 may pivot, or arm 326 may pivot about the axis A31 to move the arm 326 to a predetermined location. A coupler 328 may extend from the arm 326 and may couple to a probe 330. The coupler 328 also may be coupled to a pump 329 or the like that enables liquids to be dispensed and aspirated by the probe 330.

In the embodiment of FIG. 3, the probe 330 is shown located in a cuvette 318, which may be one of the cuvettes 218 located in the dilution ring 214. For example, the post 324 may have rotated to a point where the probe 330 is located above the cuvette 318. Mechanisms (e.g., motors and drives not shown) may have moved the post 324 and/or the probe 330 in the Z-direction to cause the probe 330 to enter into or withdraw from the cuvette 318. The probe 330 may then aspirate and/or dispense a liquid from or to the cuvette 318. Should an aspiration or dispense operation encounter an error, liquid may spill from the probe 330 onto the surface 212S of the platform 212 or onto other components in the chamber 102 as described herein.

In the example of FIG. 2, the first probe assembly 220A may be configured to transfer specimens (not shown in FIG. 2) to the cuvettes 218 in the dilution ring 214 from sample containers in one or more racks (not shown), for example. The second probe assembly 220B may be configured to transfer specimens (e.g., diluted specimens) from the cuvettes 218 in the dilution ring 214 to the cuvettes 218 in the reaction ring 216. The third probe assembly 220C and the fourth probe assembly 220D may be configured to transfer reagents (not shown in FIG. 2) to the cuvettes 218 in the reaction ring 216. Should errors occur during aspiration, dispensing, or transfer operations performed by any of the probe assemblies 220, the liquids may spill onto the platform 212 or onto other components in the chamber 102. The probe assemblies 220 may be operated by the computer 108 (FIG. 1) and programs 108C executing on the computer 108.

The chamber 102 may include one or more wash stations that are configured to wash the cuvettes 218. In the embodiment of FIG. 2, a first wash station 222A is located proximate the dilution ring 214 and is configured to wash the cuvettes 218 in the dilution ring 214. In the embodiment of FIG. 2, a second wash station 222B is located proximate the reaction ring 216 and is configured to wash the cuvettes 218 in the reaction ring 216. The first wash station 222A and the second wash station 222B may include a plurality of probes (not shown in FIG. 2) that apply and remove liquids to and from the cuvettes 218 to wash the cuvettes 218. Should an error occur during one or more of the wash processes, liquids may spill from the first wash station 222A and/or the second wash station 222B. The liquids may spill onto the platform 212 or onto other components in the chamber 102 as described herein. Operation of the first wash station 222A and the second wash station 222B may be controlled by the computer 108 (FIG. 1) and programs 108C executing on the computer 108.

The chamber 102 may include one or more mixers that are configured to mix liquids in the cuvettes 218. In the embodiment of FIG. 2, the chamber 102 includes three mixers 226 including a dilution mixer 226A, a reagent mixer 226B, and a specimen mixer 226C. The dilution mixer 226A is configured to mix liquids in the cuvettes 218 in the dilution ring 214. The reagent mixer 226B and the specimen mixer 226C are configured to mix liquids in the cuvettes 218 in the reaction ring 216.

Figure 4:
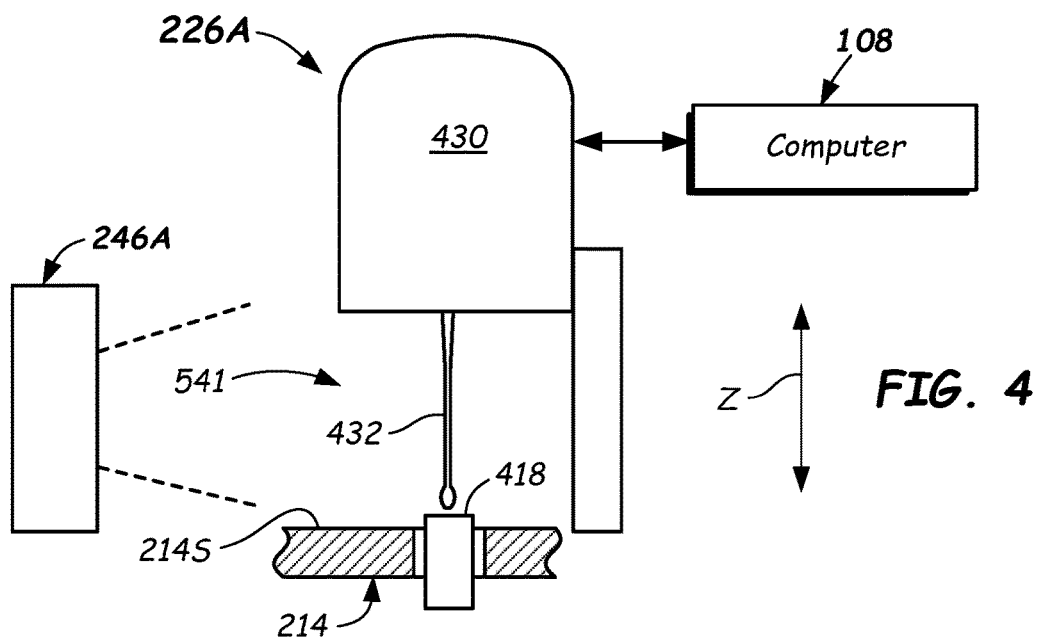
FIG. 4 illustrates a side elevation view of a mixer and a partial cross-sectioned view of a dilution ring in a chamber of a diagnostic instrument according to one or more embodiments.

Additional reference is made to FIG. 4, which illustrates a side elevation view of the dilution mixer 226A and a partial cross-sectioned view of the dilution ring 214. The dilution mixer 226A may be similar to or identical to the reagent mixer 226B and/or the specimen mixer 226C. The dilution mixer 226A may include a motor 430 configured to spin an impeller 432. The computer 108 (FIG. 1) may be coupled to the motor 430 and may be configured to generate signals or instructions that cause the motor 430 to spin the impeller 432. The impeller 432 may be configured to move in the Z-direction to enter into and withdraw from a cuvette 418. The spinning impeller 432 mixes liquids in the cuvette 418. In some embodiments, the impeller 432 may move in the z-direction independent of the motor 430. In other embodiments, the motor 430 may be configured to move in the Z-direction, which moves the impeller 432 in the Z-direction.

Improper mixing by the mixers 226 may damage or distort the cuvettes 218. The damage to the cuvettes 218 may cause anomalous light absorption during photometric analyses, which may possibly invalidate the analyses. Improper mixing may occur if alignment between the impeller 432 and the cuvette 418 in the Z-direction is not correct. In other embodiments, if the impeller 432 contacts the cuvette 418, such as being misaligned in Z-direction, the X-direction, or the Y-direction (FIG. 1), the cuvette 418 could be damaged.

As described above, when the cuvette 418 is damaged, unexpected light scattering during photometric analyses may occur. In other embodiments, improper mixing of liquids in the cuvette 418 may occur if the impeller 432 stops spinning. Improper mixing may result in erroneous photometric analyses. In some embodiments, uncontrolled mixing, such as mixing at high or unsafe speeds, could also cause liquids spilling out of the cuvette onto the platform 212 or any other component in the vicinity of cuvette 418. The liquid may even splash back onto the mixer motor 430 or impeller 432, which could damage the mixers 226.

Figure 5:
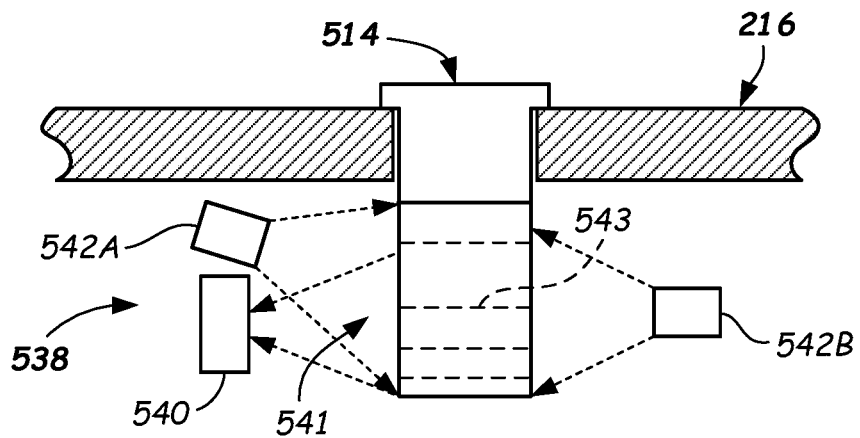
FIG. 5 illustrates a partial cross-sectional view of a reaction ring of a platform of a diagnostic instrument including an optical inspection system located below the reaction ring according to one or more embodiments.

The diagnostic instrument 100 (FIG. 1) may include an optical inspection system configured to perform photometric analysis on specimens located in the cuvettes 218 in the reaction ring 216. Reference is made to FIG. 5, which illustrates a partial cross-sectional view of the reaction ring 216 of the platform 212 including an optical inspection system 538. The optical inspection system 538 may be located beneath the platform 212 and/or the reaction ring 216 as shown in FIG. 5 so as to be isolated from any extraneous light in the chamber 102 above the platform 212.

In the embodiment of FIG. 5, the optical inspection system 538 may include an imaging device 540 and at least one illumination source. In the embodiment of FIG. 5, the optical inspection system 538 includes a front illumination source 542A and a back illumination source 542B. Front illumination is provided on a same side of the cuvette 514 as the imaging device 540, whereas back illumination is provided on an opposite side of the cuvette 514 as the imaging device 540. The reaction ring 216 may rotate so that different ones of the cuvettes 218 (FIG. 2) may be within an imaging location 541 of the imaging device 540. Imaging location can be the position where the imaging device 540 is focused.

In the configuration of FIG. 5, a cuvette 514 is located at an imaging location 541 of the imaging device 540 and/or the optical inspection system 538. During optical analysis, at least one of the front illumination source 542A or the back illumination source 542B illuminates the cuvette 514. Accordingly, the imaging location 541 may be a location where the cuvette 514 may be illuminated by at least the front illumination source 542A or the back illumination source 542B and the location where a focused image is obtained. While the cuvette 514 and thus, a liquid located in the cuvette 514, are illuminated, the imaging device 540 captures an image of the cuvette 514 and the liquid located in the cuvette 514. The images captured by the imaging device 540 may be analyzed by the programs 108C (FIG. 1) executed on the computer 108 as described herein. In some embodiments, the images captured by the imaging device 540 may be displayed on the display 106 (FIG. 1).

The front illumination source 542A and the back illumination source 542B may each emit specific and/or selectable wavelengths or spectrums of light. The light emitted by the front illumination source 542A may reflect from liquids in the cuvette 514 and may be captured by the imaging device 540. The captured image comprises image data that may be analyzed by the computer 108 (FIG. 1). The computer 108 or programs 108C executing on the computer 108, based on the image data, may determine whether at least one analyte is present in the liquid and/or the concentration of at least one analyte in the liquid. The back illumination source 542B may emit light that passes through the cuvette 514 and the liquid 543 stored therein. The imaging device 540 may then capture an image of the liquid 543 in the cuvette 514 and perform the analyses described above.

In some embodiments, the optical inspection system 538 may use lasers and laser light, which, in some embodiments may be substantially a single wavelength. For example, the front illumination source 542A and/or the back illumination source 542B may be a laser and the imaging device 540 may be a device that measures laser light and generates a signal in response to receiving the laser light. In some embodiments, the imaging device 540 may generate a laser reading based at least in part on the received laser light.

In some embodiments, the environment of the chamber 102 (FIG. 2) is dark when the optical inspection system 538 operates, so no extraneous light can affect the optical inspection system 538. In some embodiments, the chamber 102 may operate in a wavelength or a spectrum of light that are not destructive to liquids 543 in the cuvette 514. In some embodiments, the chamber 102 may be operated in a wavelength or a spectrum of light that are not destructive to liquids in the cuvette 514 but that are not able to be imaged by the imaging device 540.

Referring again to FIG. 2, the chamber 102 may include one or more imaging systems 246 configured to capture images of imaging locations using different wavelengths or spectrums of light. In the embodiment of FIG. 2, the chamber 102 can include seven imaging systems 246 that are referred to individually as a first imaging system 246A, a second imaging system 246B, a third imaging system 246C, a fourth imaging system 246D, a fifth imaging system 246E, a sixth imaging system 246F, and a seventh imaging system 246G. Other embodiments of the chamber 102 may include fewer or more imaging systems 246. Each of the imaging systems 246 may be configured to capture an image of a particular imaging location within the chamber 102. In some embodiments two or more imaging locations may overlap.

In the embodiment of FIG. 2, each of the imaging systems 246 may illuminate their respective imaging locations. One or more of the imaging locations may include one or more components in the chamber 102. In some embodiments, one or more of the imaging locations may include one or more areas of the platform 212 where a liquid may spill in response to an error with a component configured to handle (e.g., transport) or process liquids. In some embodiments, imaging locations may include one or more components configured to process or analyze a specimen. In other embodiments described herein, the chamber 102 may include one or more illumination sources that illuminate one or more imaging locations. The imaging systems 246 may include components configured to conditionally illuminate the imaging locations at various wavelengths or spectrums of light as described herein.

Figure 6A:
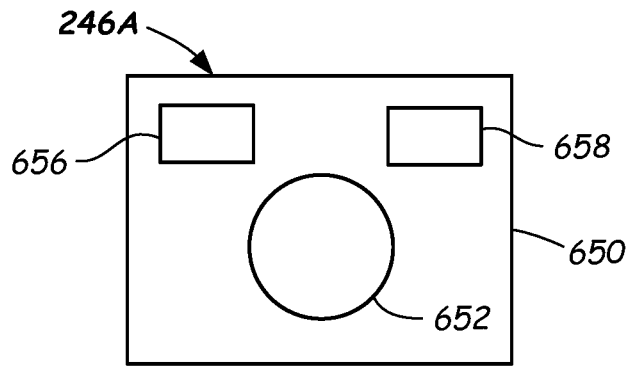
FIG. 6A illustrates a front elevation view of an embodiment of an imaging system configured to be located in a chamber of a diagnostic instrument according to one or more embodiments.

Additional reference is made to FIG. 6A, which illustrates a front elevation view of an embodiment of the first imaging system 246A, which may be identical or substantially similar to all the imaging systems 246. Additional reference is also made to FIG. 6B, which is a side elevation view of the first imaging system 246A of FIG. 6A. The first imaging system 246A may be similar to a digital camera configured to capture an image of an imaging location and convert the image to image data that may be analyzed by programs 108C (FIG. 1) executing on the computer 108. The first imaging system 246A may be housed within a housing 650. The housing 650 may contain electronic components (not shown) that operate the first imaging system 246A and generate image data. All the imaging systems 246 may be similar or identical to the first imaging system 246A.

The housing 650 may include an aperture 652 that enables light to enter the housing 650 and be converted to image data by electronic components (not shown) located therein. The first imaging system 246A may have a field of view 654 defined by line 654A and line 654B when viewed from the side of FIG. 6B. Both the line 654A and the line 654B may extend to the aperture 652. The field of view 654 defines the area that may be imaged by the first imaging system 246A and thus defines an imaging location 541.

Figure 6B:
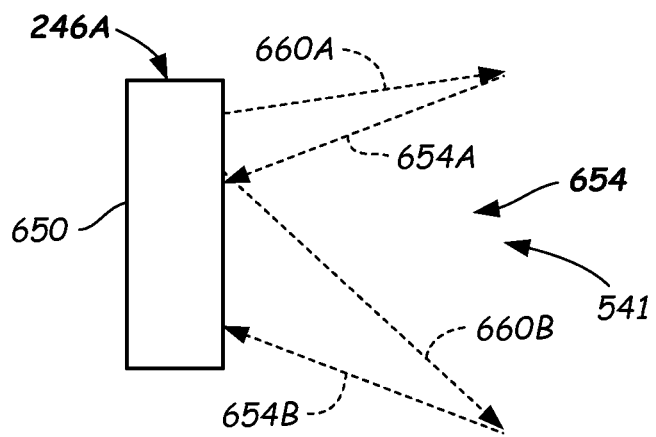
FIG. 6B illustrates a side elevation view of the imaging system of FIG. 6A according to one or more embodiments.

The housing 650 may include a first illumination source 656 (e.g., a first light source) and a second illumination source 658 (e.g., a second light source). The first illumination source 656 and the second illumination source 658 may emit different wavelengths or spectrums of light. As used herein, a spectrum of light may include a single wavelength of light or a frequency band of light. In some embodiments, the first illumination source 656 emits first light including the first spectrum of light and the second illumination source 658 emits second light including the second spectrum of light. In some embodiments, the first light and the second light may have narrow spectrums or substantially single wavelengths. Both the first illumination source 656 and the second illumination source 658 may emit light in patterns configured to illuminate the field of view 654 constituting the imaging location 541. The illumination pattern as viewed from the side elevation view of FIG. 6B is defined by the line 660A and the line 660B. Other patterns are possible.

The first imaging system 246A is configured to capture images of items in the field of view 654 illuminated by either or both the first illumination source 656 and the second illumination source 658. In some embodiments, the first illumination source 656 is configured to illuminate an imaging location with first light having the first spectrum. The first spectrum may include or be a first wavelength of light. The first wavelength of the first spectrum of light may be from 900 nm to 1,100 nm, for example. In some embodiments, the second illumination source 658 is configured to illuminate the imaging location with second light having the second spectrum. The second spectrum may include or be a second wavelength of light. The second light may include a second wavelength of from 355 nm to 375 nm, for example.

The second spectrum is more destructive to a specimen configured to be received in the diagnostic instrument and/or the chamber 102 than the first spectrum. In some embodiments, one or both the first illumination source 656 and the second illumination source 658 may include one or more sources, such as light-emitting diodes (LEDs) that emit light at different wavelengths (e.g., different spectrums). In some embodiments, the first illumination source 656 and the second illumination source 658 may be a single illumination device that emits all the spectrums described herein.

In some embodiments, the first illumination source 656 is configured to emit light in the near infrared spectrum (NIR), which may have a wavelength or wavelengths of about 800 nm in one embodiments, but may be anywhere from 750 nm to 2,500 nm in others. The second illumination source 658 may be configured to emit ultraviolet (UV) light having a wavelength or wavelengths of about 365 nm in some embodiments, but may be anywhere from 100 nm to 400 nm in others.

The NIR light may be less destructive to specimens, such as specimens in the cuvettes 218, than the UV light. The UV light or other light emitted by the second illumination source 658 may be used for short periods to detect items such as blood, serum, or plasma. The first imaging system 246A may be configured to capture images of items illuminated by the first spectrum (e.g., NIR light) and items illuminated by the second spectrum (e.g., UV light).

Referring again to FIG. 2, the imaging systems 246 may capture images of different imaging locations throughout the chamber 102. The imaging locations are locations that are able to be imaged by the imaging systems 246. In the embodiment of FIG. 2, the first imaging system 246A may be configured to capture images of the dilution mixer 226A. Accordingly, the imaging location 541 associated with the first imaging system 246A may include the dilution mixer 226A. In some embodiments, the imaging location 541 also may include the area proximate the dilution mixer 226A.

FIG. 4 illustrates an embodiment of the configuration of the first imaging system 246A relative to the dilution mixer 226A. Other imaging systems located proximate other ones of the mixers 226 may have similar configurations. The first imaging system 246A may be configured to capture images of the motor 430, the impeller 432, a top surface 214S of the dilution ring 214, and/or a top portion of the cuvette 418. Accordingly, one or more of these items may be at the imaging location 541 or in the imaging location associated with the first imaging system 246A. In some embodiments, images captured by the first imaging system 246A may be displayed on the display 106 (FIG. 1).

In the embodiment of FIG. 2, the seventh imaging system 246G is configured to capture images of the first probe assembly 220A, which is further illustrated in FIG. 3. Other imaging systems may be configured to capture similar images relative to other ones of the probe assemblies 220. The seventh imaging system 246G may be configured to capture images of the probe 330, the coupler 328, the top surface 214S of the dilution ring 214, and/or a top portion of the cuvette 318. Accordingly, one or more of these items may be at the imaging location 341 or in the imaging location associated with the seventh imaging system 246G. Images captured by the seventh imaging system 246G may be displayed on the display 106 (FIG. 1).

In the embodiment of FIG. 2, the second imaging system 246B is configured to capture images of the first wash station 222A and the third imaging system 246C is configured to capture images of the second wash station 222B. In some embodiments, the second imaging system 246B and the third imaging system 246C may be configured to also capture images of areas proximate the first wash station 222A and the second wash station 222B, respectively. Images captured by the second imaging system 246B and/or the third imaging system 246C may be displayed on the display 106 (FIG. 1).

During operation of the diagnostic instrument 100 (FIG. 1), the chamber 102 may be closed to prevent ambient light from entering the chamber 102. The ambient light may cause damage to the specimens and/or reagents located in the chamber 102. Referring to FIG. 2, the specimens may be located in the cuvettes 218 and/or the probe assemblies 220. The interior of the chamber 102 may be illuminated in a surveillance mode with first light that is not destructive to the specimens and/or the reagents. The first light may be light in the first spectrum. In some embodiments, the first light may be IR or NIR light, for example. In other embodiments, other spectrums of light non-destructive to specimens may be used. The first light may illuminate one or more of the imaging locations for a first period, which may be indefinite, such as when the first light is used for surveillance purposes.

The first light may not be able to provide adequate illumination for a visual inspection system to accurately analyze items in the imaging locations. If a determination is made that additional analysis is required, such as if a liquid spill is suspected, the diagnostic instrument 100 (FIG. 1) or the computer 108 (FIG. 1) may determine the second spectrum of light that may be used to illuminate the imaging location 341, 541. If the second spectrum of light is destructive to the specimens or other liquids, the diagnostic instrument 100 or the computer 108 may determine a period that the second spectrum is used to illuminate the imaging location.

Figure 7A:
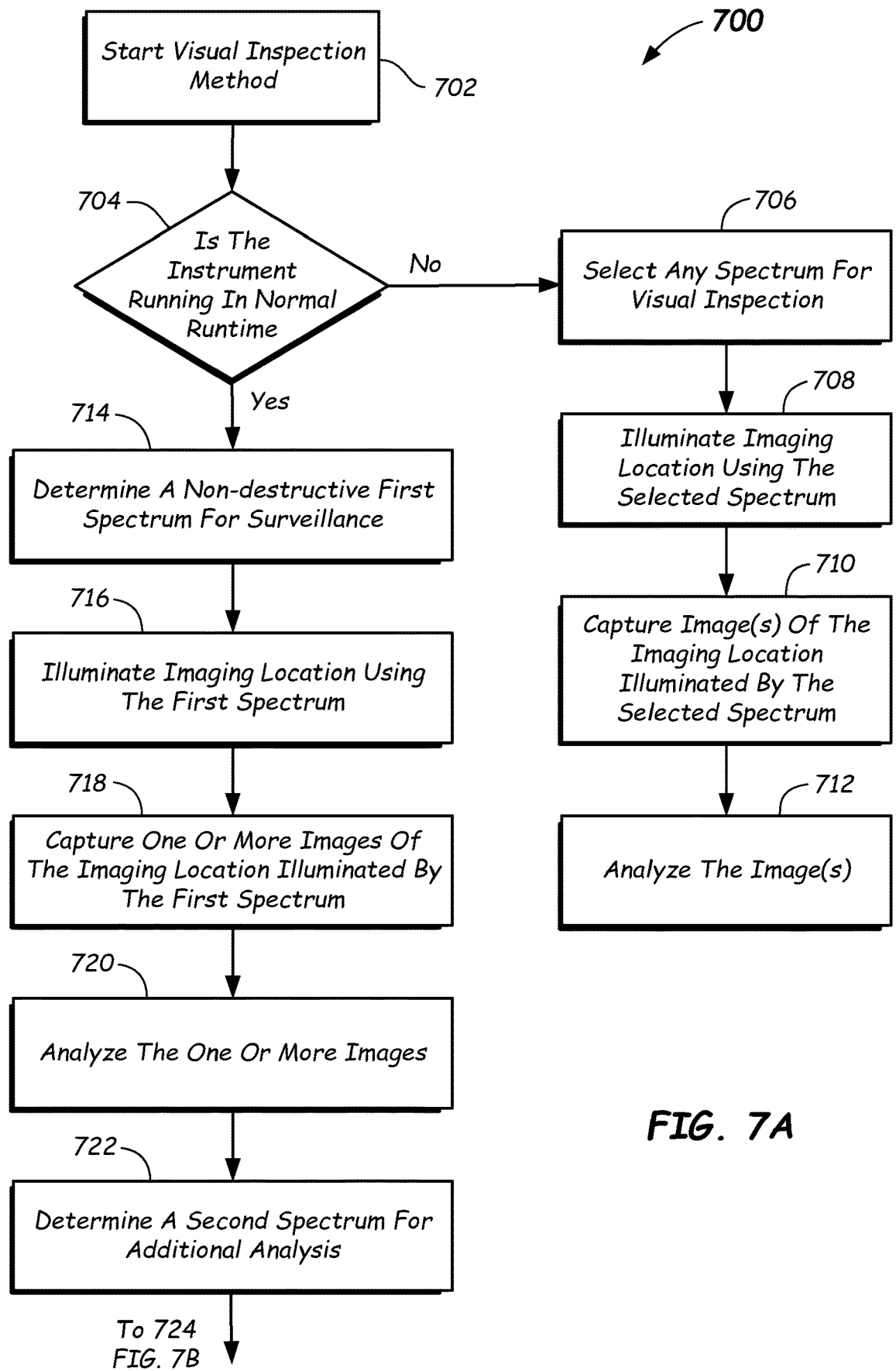
FIGS. 7A and 7B are a flowchart illustrating a method of operating a diagnostic instrument according to one or more embodiments.
Figure 7B:
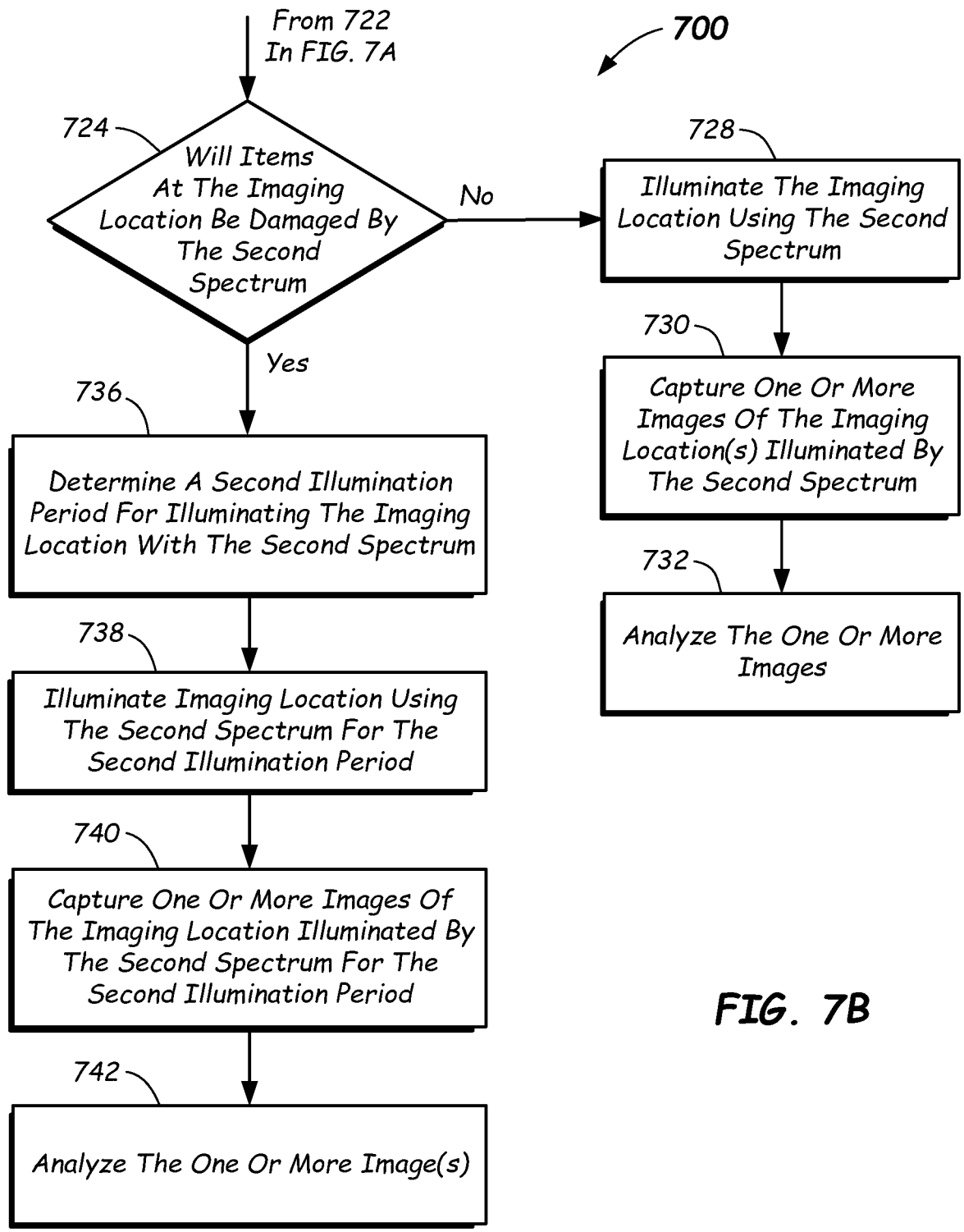

Additional reference is made to FIGS. 7A and 7B, which make up a flowchart describing an embodiment of a method 700 of operating a diagnostic instrument, such as the diagnostic instrument 100 (FIG. 1). The method 700 commences at block 702 with starting a visual inspection. The start of the visual inspection may include determining that capturing an image of one or more of the imaging locations is necessitated. The reasons for capturing images may include maintenance and diagnostics, such as determining a cause of an error in the operation of the diagnostic instrument 100. Other reasons for capturing images also may include detection of a liquid spill within the chamber 102. In some embodiments, the start of the visual inspection occurs when the diagnostic instrument 100 starts operating in the surveillance mode as described above.

Processing proceeds to decision block 704 where a determination is made as to whether the diagnostic instrument 100 is running in normal runtime. Normal runtime includes times when the diagnostic instrument 100 is operating with specimens located therein or with specimens located in the chamber 102. Normal runtime may include times when the diagnostic instrument 100 is operating with at least one reagent located within the chamber 102. In some embodiments, normal runtime is when the diagnostic instrument 100 is analyzing a specimen, such as when a specimen is being analyzed in the chamber 102.

If the result of decision block 704 is negative, the diagnostic instrument 100 may be in a condition where the chamber 102 may be accessed without damaging specimens or reagents. For example, because no specimens and/or reagents are present in the chamber 102, the chamber 102 may be exposed to any of the spectrums of light. Processing then proceeds to block 706 where any spectrum of light may be selected for the visual inspection. The spectrum of light may, as an example, be optimized based on the type of visual inspection being performed. For example, if spilled blood, plasma, or serum is being imaged during the visual inspection, UV light may be used to illuminate the imaging location (s) being inspected. Processing proceeds to 708 where the imaging location is illuminated using the spectrum selected in block 706.

With reference to FIG. 6A, at least one of the first illumination source 656 or the second illumination source 658 may generate the selected spectrum of light. Processing then proceeds to block 710 where one or more images of the imaging location illuminated in block 708 are captured. For example, at least one of the imaging systems 246 (FIG. 1) may be used to capture the one or more images. In block 712, the one or more images are analyzed. For example, image data of the imaging location may be analyzed by the computer 108 and/or the programs 108C. In some embodiments, the captured image may be displayed on the display 106. In some embodiments, spills may be detected or operating characteristics of the components in the chamber 102 may be analyzed by the analysis in 712.

Returning again to decision block 704, if the outcome is positive, the diagnostic instrument 100 is operating in runtime. In such situations, specimens may be located in the chamber 102 to be analyzed and/or reagents may be located in the chamber 102 to be mixed with the specimens. In such situations, specimens and/or reagents may be exposed to visible light or spectrums of light that are damaging to the specimens and/or reagents if any visual inspection using destructive a spectrum is performed.

If yes, processing proceeds to block 714 in response to the diagnostic instrument 100 being operated in runtime. In block 714, a determination is made as to a non-destructive first spectrum of light that may be used for optical surveillance in the chamber 102. In some embodiments, one or more programs 108C executing in the computer 108 determines the specimens and/or reagents that are in the chamber 102 during runtime. The programs 108C may also determine the specific locations of the specimens and/or reagents within the chamber 102 during runtime. Based at least in part on the specimens and/or reagents that may be located in the chamber 102 at a point in the runtime where surveillance is to be performed, the programs 108C may look up or determine a non-destructive first spectrum that may be used for the surveillance. For example, if blood, serum, or plasma specimens are located in the chamber 102, IR or NIR spectrums may be selected for surveillance provided that the IR or NIR spectra does not damage reagents that may be exposed to the IR or NIR spectrums. Other first spectrums may be used for other specimen types and the respective reagents used to analyze these other specimen types. A first period of time that the first spectrum is used for illumination of the imaging locations may also be selected.

Processing then proceeds to block 716 where an imaging location is illuminated using the first spectrum. In the embodiments shown in FIGS. 2 through 4, the imaging systems 246 may illuminate their respective imaging locations with light of the first spectrum. In some embodiments, only select ones of the imaging systems 246 or other illumination systems may illuminate their respective imaging locations. In some embodiments, the imaging location is illuminated for the first period of time.

Referring now to FIG. 3 for example, an illumination source in the seventh imaging system 246G may illuminate the probe 330, the cuvette 318, and/or the top surface 214S of the dilution ring 214 with light of the first spectrum. Referring to FIG. 4 as another example, an illumination source in the first imaging system 246A may illuminate portions of the dilution mixer 226A such as the impeller 432 or motor 430, the cuvette 418, and/or the top surface 214S of the dilution ring 214. Other imaging locations may be illuminated by their respective illumination sources.

Again referring to FIGS. 7A and 7B, processing then proceeds to block 718 where one or more images of the imaging location illuminated by the first spectrum are captured. Referring again to FIG. 3 as an example, an imaging device in the seventh imaging system 246G may capture one or more images of the coupler 328, the probe 330, the cuvette 318, and/or the top surface 214S of the dilution ring 214. Referring to FIG. 4 as another example, an imaging device in the first imaging system 246A may capture one or more images of one or more portions of the dilution mixer 226A such as of the motor 430 or the impeller 432, the cuvette 418, and/or the top surface 214S of the dilution ring 214. Other imaging locations may be captured by other imaging devices. One or more images captured by the imaging devices may be displayed on the display 106 (FIG. 1).

Processing then proceeds to block 720 where one or more of the captured images are analyzed. The analyses in 720 may identify one or more items in the captured images. In some embodiments, the images captured in block 718 can be video images and the analysis in block 720 involves analysis of the video images. Alternatively, or in addition, still images may be captured. Referring to FIG. 3, the analysis in block 720 may include analyses of a position of the probe 330 using the first spectrum (e.g., IR or NIR spectra). For example, the analyses may determine the position of the probe 330 relative to the cuvette 318 and/or the dilution ring 214. In some embodiments, the position of the probe 330 in the Z-direction is determined by the analyses in block 720. Referring to FIG. 4, the analyses in block 720 may determine the position and/or alignment of the impeller 432 relative to the cuvette 418 and/or the dilution ring 214. The analysis in block 720 may be performed by one or more of the programs 108C or by a user of the diagnostic instrument 100 viewing the captured images, such as on the display 106. Again, the images may be video images and/or one or more still images.

Processing then may proceed to block 722 where a determination is made whether a second spectrum of light for a second analysis is required, and if so, then in block 722 a second spectrum of light is determined for an additional analysis. In some embodiments, if a liquid spill is detected or suspected at an imaging location based on the analysis in block 720, the imaging location may be better analyzed by a second analysis using the second spectrum of light. In situations where a spill of blood, plasma, or serum is suspected based on the analysis, the determination in block 722 may be that IR light (the second spectrum) may provide better illumination for more accurate analysis.

For example, the suspected liquid spill may have occurred as a result of an error in mixing using one or more of the mixers (e.g., mixer 226A). In another embodiment, a collision of one or more items in the chamber 102 may prompt the computer 108 to further analyze the chamber 102 to determine if a liquid 543 has been spilled. In other embodiments, an error in the operation of one or more of the probe assemblies 220 may have caused a liquid spill. In other embodiments, an error in the operation of the first wash station 222A and/or the second wash station 222B may cause a liquid spill. In other embodiments, an error in the mixer motor 430 may cause a liquid spill as described above.

Now referring to FIG. 7B, processing proceeds to decision block 724 where a determination is made as to whether items at the imaging location will be damaged by the second spectrum of light. In some embodiments, the decision block 724 may determine an extent to which the items in the imaging location will be damaged. If the result of decision block 724 is negative or the extent of damage is below a predetermined threshold, processing proceeds to block 728 where the imaging location is illuminated now using the second spectrum of light. Per the negative outcome of decision block 724, the second spectrum of light will not damage items in the one or more imaging locations. Processing then may proceed to block 730 wherein one or more images of the imaging location illuminated by the second spectrum are captured. The processing then may proceed to block 732 where the captured images are analyzed. In some embodiments, the display 106 (FIG. 1) may display the one or more of the images. In some embodiments, the one or more imaging systems 246 capture video images that are analyzed. Alternatively, or in addition, still images may be captured.

In response to the outcome of decision block 724 being affirmative (Yes), processing proceeds to block 736 where an illumination period for illuminating the imaging location with the second spectrum of light is determined. This illumination period may be referred to as the second period or the second illumination period. In some embodiments, the computer 108 may perform the determination made in block 736. The illumination period is a period that the items in the chamber 102 may be exposed to the second spectrum of light without damaging the items or by only damaging the items negligibly or less than a predetermined amount. In some embodiments, the second illumination period may, as an example, be less than 150 ms, such as about 100 ms, which may be enough time to capture an image of an item (e.g., blood, serum, or plasma) without any appreciable damage done to the item. In some embodiments, the second spectrum may enable a longer second illumination period, such as 100 ms to 200 ms without damaging the items, which may enable capturing a more precise image. In some embodiments, even slight exposure to the second spectrum may damage the items, so the second imaging period may be even less than 100 ms. In some embodiments, the second illumination period may be about 150 μs, for example.

Processing proceeds to block 738 where the imaging location is illuminated using the second spectrum for the second illumination period determined at block 736. Processing then proceeds to block 740 where one or more images of the imaging location illuminated by the second spectrum of light for the second illumination period are captured. The one or more images may then be analyzed in block 742 as described herein.

In other embodiments, manual surveillance may be performed, for example, by a user who has limited experience in inspecting items illuminated by the first spectrum (e.g., NIR) of light. In such embodiments, illumination solely by the first spectrum may not provide adequate illumination for capture and/or analysis. In order to overcome this issue, the imaging location(s) may be illuminated with a second spectrum that may be more destructive than the first spectrum for a short period. For example, when video images are captured, short, strobe-like flashes using illumination with the second spectrum may be interleaved with video images captured using illumination with the first spectrum. In some embodiments, the illumination with the second spectrum may occur at regular intervals. In some embodiments, the illumination with the second spectrum may occur for second illumination periods of 100 ms, for example. Other second illumination periods may be used. The use of the second spectrum interleaved with the first spectrum may enable a human to better see and discern items in the captured video.

Figure 8:
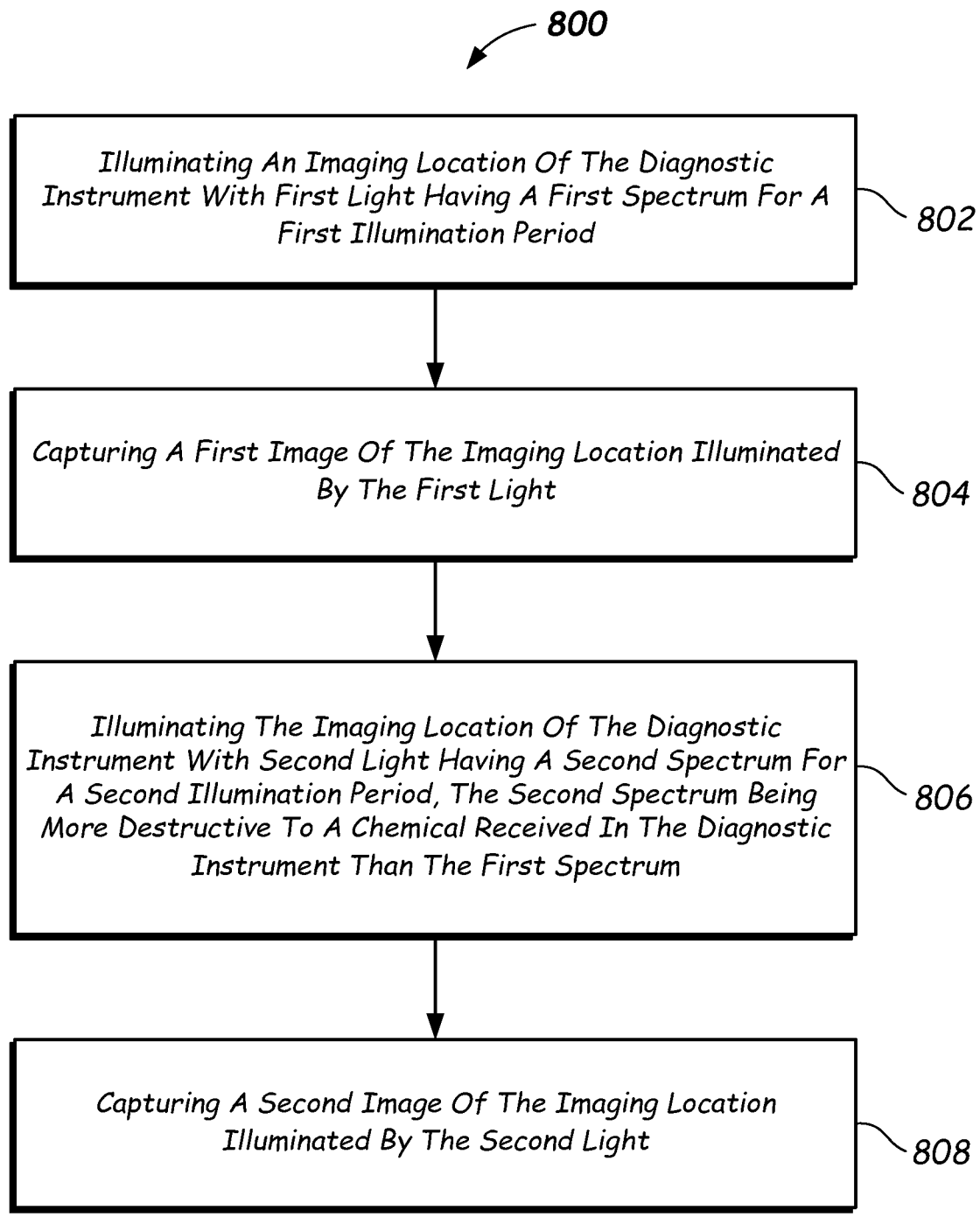
FIG. 8 is a flowchart illustrating a method of operating a diagnostic instrument according to one or more embodiments.

Reference is now made to FIG. 8, which is a flowchart illustrating a method 800 of operating a diagnostic instrument (e.g., diagnostic instrument 100). The method 800 includes, in block 802, illuminating an imaging location of the diagnostic instrument with first light having a first spectrum for a first illumination period. The method 800 includes, in block 804, capturing a first image of the imaging location illuminated by the first light. The method 800 includes, in block 806, illuminating the imaging location of the diagnostic instrument with second light having a second spectrum for a second illumination period, the second spectrum being more destructive to a chemical received in the diagnostic instrument than the first spectrum. The method 800 includes, in block 808, capturing a second image of the imaging location illuminated by the second light.

Figure 9:
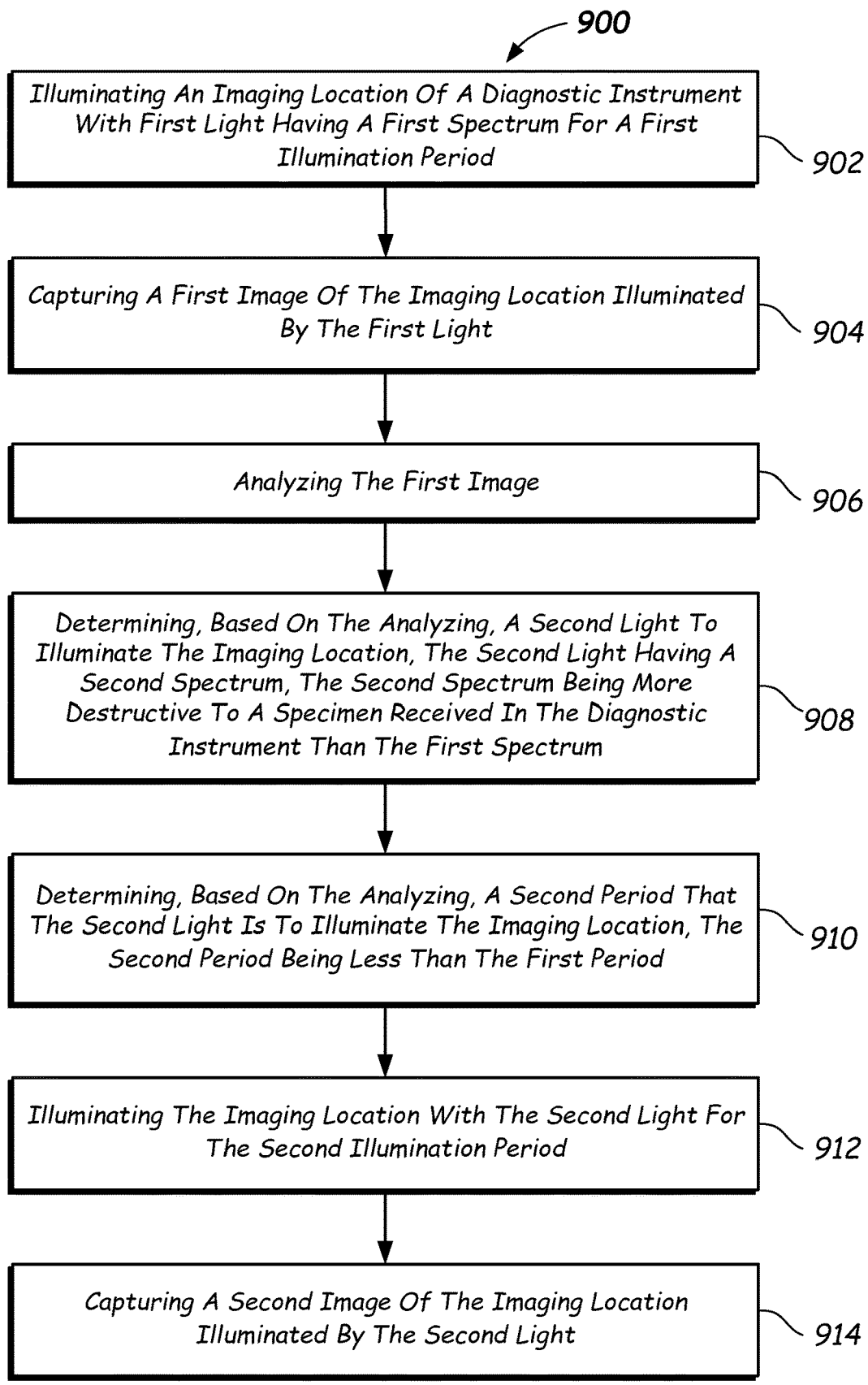
FIG. 9 is a flowchart illustrating another method of operating a diagnostic instrument according to one or more embodiments.

Reference is now made to FIG. 9, which is a flowchart illustrating a method 900 of operating a diagnostic instrument (e.g., diagnostic instrument 100). The method 900 includes, in 902, illuminating an imaging location of the diagnostic instrument with first light having a first spectrum for a first period. The method 900 includes, in 904, capturing a first image of the imaging location illuminated by the first light. The method 900 includes, in 906, analyzing the first image. The method 900 includes, in 908, determining, based on the analyzing, a second light to illuminate the imaging location, the second light having a second spectrum, the second spectrum being more destructive to a specimen receivable in the diagnostic instrument than the first spectrum. The method 900 includes, in 910, determining, based on the analyzing, a second period that the second light is to illuminate the imaging location, the second period being less than the first period. The method 912 includes, in 912, illuminating the imaging location with the second light for the second period. The method 900 includes, in 914, capturing a second image of the imaging location illuminated by the second light.

While the disclosure is susceptible to various modifications and alternative forms, specific methods and apparatus embodiments have been shown by way of example in the drawings and are described in detail herein. It should be understood, however, that the particular methods and apparatus disclosed herein are not intended to limit the disclosure but, to the contrary, are intended to cover all modifications, equivalents, and alternatives falling within the scope of the claims.

What is claimed is:

1. A method of operating a diagnostic instrument, comprising:
    illuminating an imaging location of the diagnostic instrument with first light having a first spectrum for a first illumination period;
    capturing a first image of the imaging location illuminated by the first light;
    analyzing the first image;
    illuminating the imaging location of the diagnostic instrument with second light in response to the analyzing, the second light having a second spectrum for a second illumination period, the second spectrum being more destructive to a chemical received in the diagnostic instrument than the first spectrum; and
    capturing a second image of the imaging location illuminated by the second light.

2. The method of claim 1, wherein the analyzing comprises identifying one or more items in the first image and determining whether the one or more items will be damaged by exposure to the second light.

3. The method of claim 1, wherein the analyzing comprises identifying one or more items in the first image and determining an extent to which the one or more items will be damaged by exposure to the second light.

4. The method of claim 1, wherein the analyzing comprises determining the second illumination period.

5. The method of claim 1, wherein the first light is infrared light or near infrared light.

6. The method of claim 1, wherein the first light includes a wavelength of from 900 nm to 1,100 nm.

7. The method of claim 1, wherein the second light is ultraviolet light.

8. The method of claim 1, wherein the second light includes a wavelength of from 355 nm to 375 nm.

9. The method of claim 1, wherein the second illumination period is about 100 ms.

10. The method of claim 1, wherein the imaging location includes a component configured to process a specimen.

11. The method of claim 1, comprising receiving a specimen, wherein the specimen is located at the imaging location.

12. A method of operating a diagnostic instrument, comprising:
    illuminating an imaging location of the diagnostic instrument with first light having a first spectrum for a first illumination period;
    capturing a first image of the imaging location illuminated by the first light;
    illuminating the imaging location of the diagnostic instrument with second light having a second spectrum for a second illumination period, wherein the second illumination period is less than 150 ms, the second spectrum being more destructive to a chemical received in the diagnostic instrument than the first spectrum; and
    capturing a second image of the imaging location illuminated by the second light.

13. A method of operating a diagnostic instrument, comprising:
    illuminating an imaging location of the diagnostic instrument with first light having a first spectrum for a first illumination period;
    capturing a first image of the imaging location illuminated by the first light;
    analyzing the first image;
    determining, based on the analyzing, a second light to illuminate the imaging location, the second light having a second spectrum, the second spectrum being more destructive to a specimen received in the diagnostic instrument than the first spectrum;
    determining, based on the analyzing, a second illumination period that the second light is to illuminate the imaging location, the second illumination period being less than the first illumination period;

illuminating the imaging location with the second light for the second illumination period; and capturing a second image of the imaging location illuminated by the second light.

14. The method of claim 13, wherein the analyzing comprises identifying one or more items in the first image and determining whether the one or more items will be damaged by exposure to the second light.

15. The method of claim 13, wherein the analyzing comprises identifying one or more items in the first image and determining an extent to which the one or more items will be damaged by exposure to the second light.

16. The method of claim 15, wherein the one or more items are at least one specimen.

17. The method of claim 13, wherein the first light is infrared light or near infrared light.

18. The method of claim 13, wherein the second light is ultraviolet light.

19. A diagnostic instrument, comprising:

an imaging location;

a first illumination source configured to illuminate the imaging location with first light having a first spectrum for a first period;

a second illumination source configured to illuminate the imaging location with second light having a second spectrum for a second period, wherein the second spectrum is more destructive to a specimen receivable in the diagnostic instrument than the first spectrum and the second period is less than the first period;

an imaging device configured to capture a first image of the imaging location illuminated by the first light and a second image of the imaging location illuminated by the second light; and a computer configured to execute instructions to:
 analyze the first image;
 determine the second spectrum in response to analyzing the first image; and
 determine the second period in response to analyzing the first image.

20. The diagnostic instrument of claim 19, wherein the computer is configured to identify one or more items in the first image and determine whether the one or more items will be damaged by exposure to the second light.

* * * * *